UNITED STATES PATENT OFFICE.

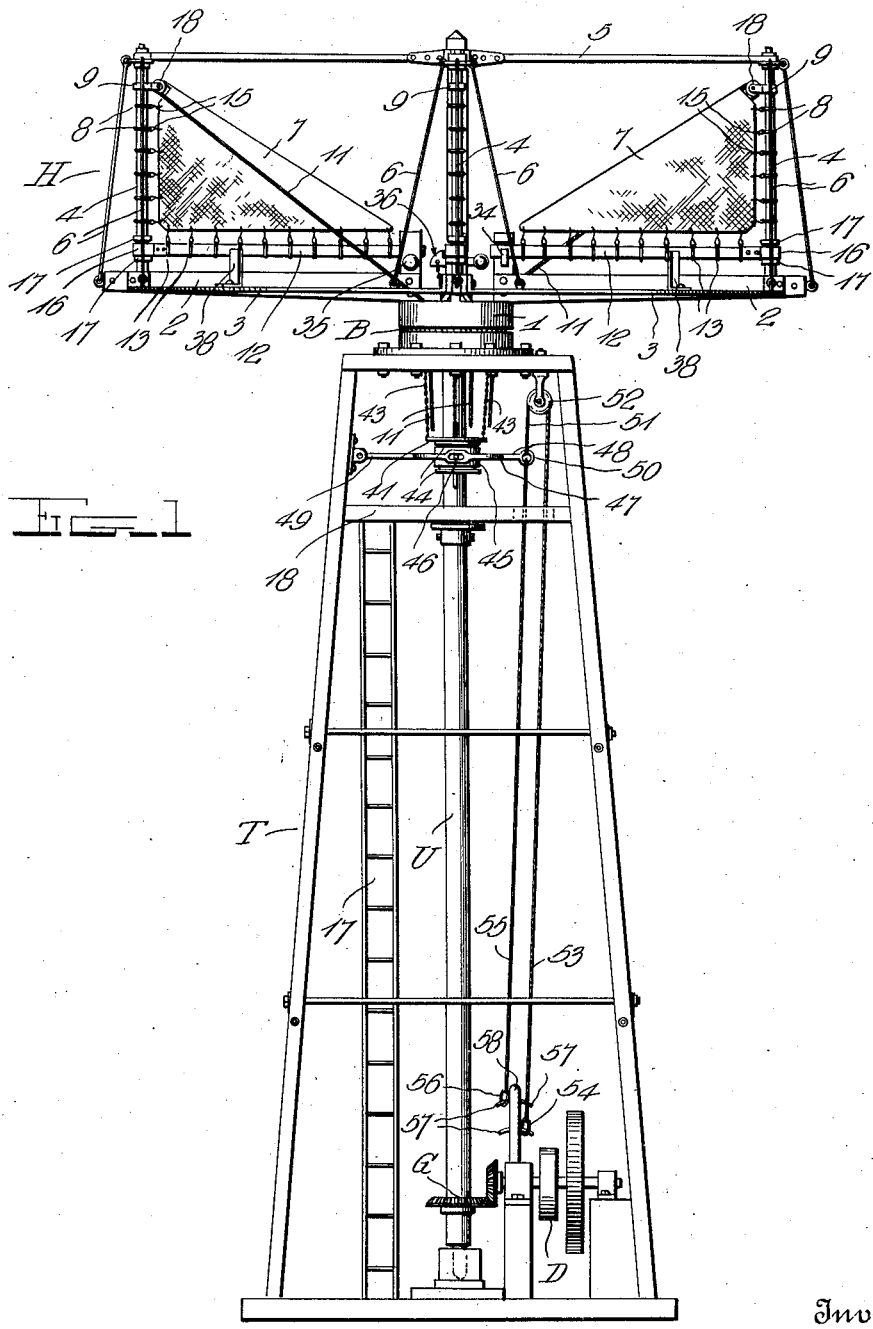

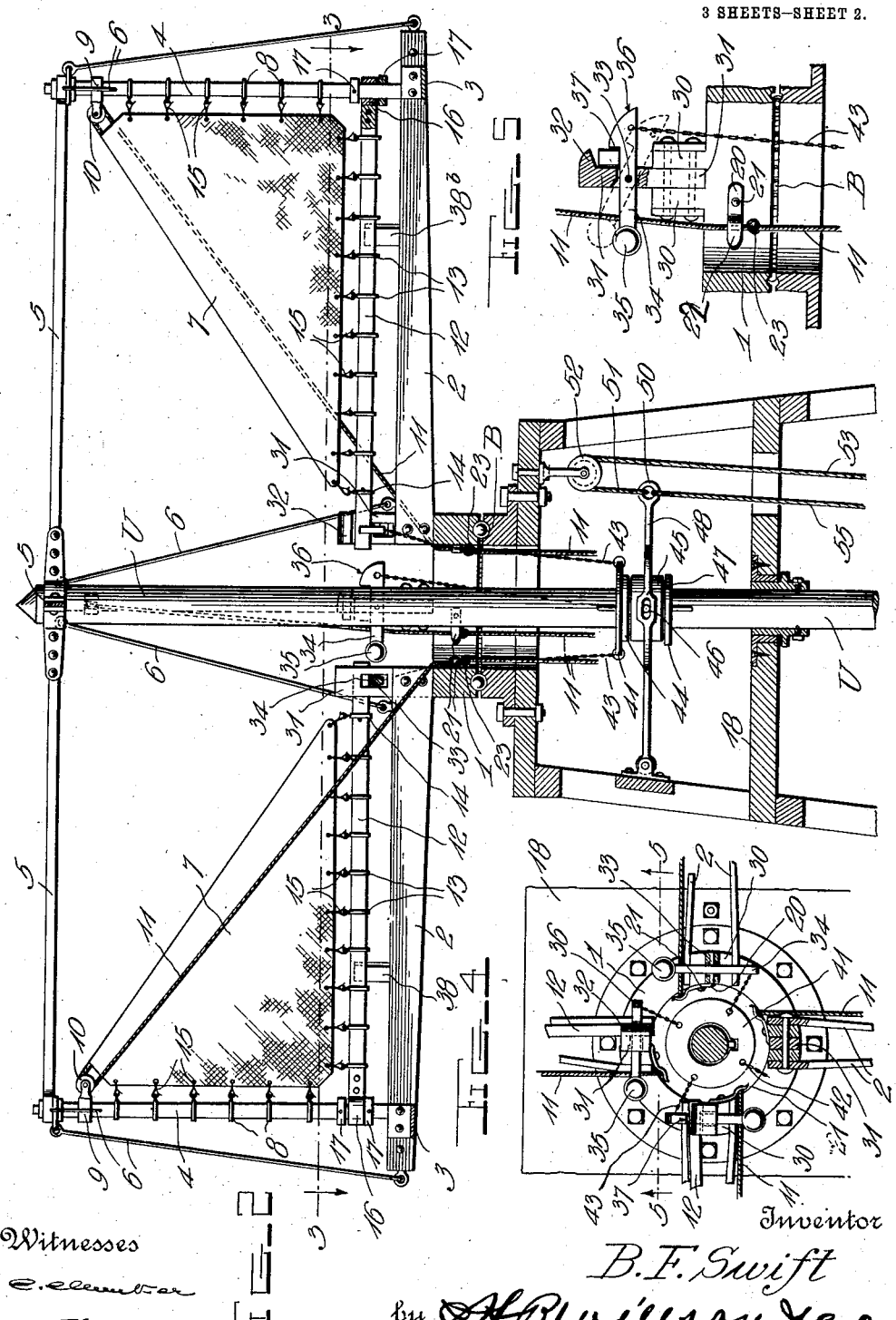

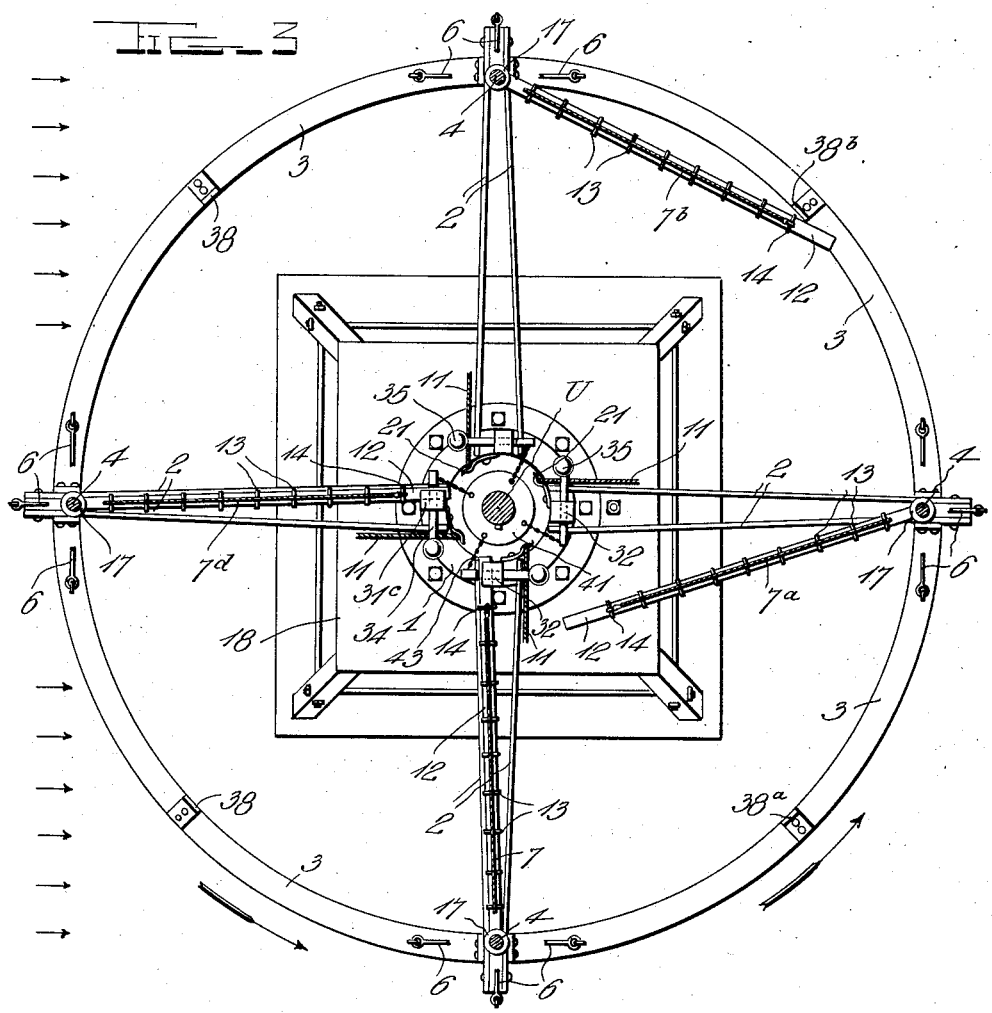

BENJAMIN F. SWIFT, OF NEWTON STEWART, INDIANA.

WINDMILL.

1,021,560.   Specification of Letters Patent.   Patented Mar. 26, 1912.

Application filed November 6, 1911. Serial No. 658,752.

*To all whom it may concern:*

Be it known that I, BENJAMIN F. SWIFT, citizen of the United States, residing at Newton Stewart, in the county of Orange and State of Indiana, have invented certain new and useful Improvements in Windmills; and I do declare the following to be a full, clear, and exact description of the invention, such as will enable others skilled in the art to which it appertains to make and use the same.

This invention relates to wind wheels, and more especially to those rotating in a horizontal plane; and the object of the same is to produce improved means for enabling the sails to be thrown out of action from a position on the ground or at the bottom of a tower. This and other objects are accomplished by the construction hereinafter more fully described and claimed and as shown in the drawings wherein:

Figure 1 is a general side elevation of this wind mill and tower complete; Fig. 2 is a central vertical section of the head of the wind wheel and the upper end of the tower; Fig. 3 is a horizontal section on the line 3—3 of Fig. 2, and on a smaller scale; Fig. 4 is a plan view of the latches around the hub of the head, one of them being shown in horizontal section; and Fig. 5 is a vertical section on about the line 5—5 of Fig. 4; Fig. 6 is a longitudinal vertical section through the controller for tilting said latches; and Fig. 7 is a sectional view on the line 7—7 of Fig. 6.

In the drawings the letter T indicates broadly the tower on which the head H of this improved wind mill is mounted, the same being supported upon ball bearings B at the upper end of the tower and mounted on the upper end of an upright shaft U which is journaled in suitable bearings and connected as by gearing G with a driving wheel D from which the power generated by the wind mill may be led to any suitable point. These general features of construction will need no further description, my invention lying in the details specifically described below.

The head H comprises a hub 1 carrying radial arms 2 (preferably about four in number) which are connected near their outer ends by a ring 3 and from which arms rise masts 4 whose upper extremities are connected with the upper end of the upright shaft U by rods 5 and with the outer extremities of the arms 2 by braces 6 so that a rigid skeleton structure is built up around the shaft U and capable of rotation upon the ball bearings B. It is to be understood that whereas I have shown four masts and sails in the present instance, there could be a greater number if desired. As they are by preference of like construction, I will describe but one.

Each sail consists of a substantially triangular sheet 7 whose upright edge is connected by rings 8 with the mast 4. The uppermost ring 9 is fast on the mast and carries a pulley 10 over which passes a halyard 11 which is attached to the upper angle or corner of the sail 7. The lower edge of the latter may be attached to a boom 12 by any suitable means, but in the present instance the attachment is shown as made by means of rings 13, the innermost of which, 14, is fast upon said boom while the others may be free. All of said rings, 8, 13 and 14 are connected with the sails by any suitable means such as the snap hooks 15 illustrated. The boom is loosely mounted at its outer end by means of an eye 16 surrounding the mast between two collars 17 as shown, and when its inner end is held by means of the latches hereinafter described the entire sail will stand radial to the head in a manner which will be clear.

The sails may be raised or lowered by means of the halyards above mentioned, and which after passing over the pulleys 10 are led inward to and through the hub 1 and downward through the ring-shaped ball bearings B to within reach of an operator who may climb the ladder 17 and stand upon the platform 18 within the tower T. It will be obvious that when any halyard is drawn upon the sail 7 attached thereto will be raised so that its rings 8 slide upward along its mast 4, whereas when the halyard 11 is loosened the sail will descend and in times of extremely bad weather may be lashed to the boom 12 so as to be entirely out of the wind. The means I employ for holding the halyard taut when the sail is spread as seen in Fig. 2 consists of a catch best illustrated in Figs. 4 and 5. The catch consists of a flat body 20 secured as by a screw or rivet 21 within the hub 1, and having at one free end a spring hook 22 behind which the halyard may be led, the latter having a knot 23 tied in it at a proper point to be engaged beneath said hook when the sail 7 is raised. It is obvious that an operator standing upon the platform 18 may reach upward, grasp the halyard, draw down upon it until it is loose within the catch, and then by moving it aside can disengage its knot 23 from beneath the hook 22, after which he can pay out the halyard and permit the sail to descend. As the hub rotates with the head, the pendant ends of the halyards 11 will be carried around in a manner which will be clear, but as the sails are seldom raised and lowered this detail is unimportant.

The latch at the inner end of each boom is best illustrated in Figs. 2, 4 and 5. Rising from the hub are spaced ears 30, and bolted between them is an upright 31 having a nose 32 at its upper end. Pivoted at 33 to said upright is a latch 34 having a weight 35 at one end and its other end beveled as at 36 and provided with an upright shoulder 37 in rear of the bevel. The construction of parts is such that the upright stands behind the inner end of the boom 12 when the latter is radial to the head H, and the weight 35 causes the latch to normally engage said boom to hold it in this position. Carried by the ring 3 at points midway between the masts 4 are stops 38 against which the outer extremities of the booms 12 will strike when the latter are released by the latches and swung to the rear under the influence of the wind. The direction of the wind is shown by the arrows in Fig. 3 where the sail $7^a$ is shown in the act of gibing so that the inner end of its boom is swinging toward the stop $38^a$, and where the sail $7^b$ is shown with its boom resting against its stop $38^b$. Between the positions of this sail at the top of the view and that at the left of the view, the inner end of the boom will of course swing inward so that when it arrives at what might be called the front of the wheel (at the left in Fig. 3) said inner end rests against the upright there indicated by the numeral $31^c$. It is obvious that in the continued rotation of the head H the sail next comes into the wind, and that lettered $7^d$ is receiving the full force thereof. This operation of the wind wheel is based on the assumption that the latches stand in the position shown in dotted lines in Fig. 5 and do not engage the inner ends of the booms as the latter swing inward against the uprights 31. Hence said uprights serve as stops to limit the inward swing of the booms, the same as the stops 38 limit their outward swing. The controlling mechanism for said latches is best seen in Figs. 2, 6 and 7. Splined at 40 upon the upright shaft U is a collar 41, from eyes 42 in which chains 43 lead upward to the beveled lighter ends of the latches (see Fig. 5), so that when said collar is depressed and all the chains are drawn upon, the several latches will be tilted to a position where they will free the inner ends of the booms and permit the latter to have the movement above described. On the other hand, when the collar is raised the inner ends of the booms will be automatically latched against the uprights 31, and after one complete revolution of the head all of the booms will be thus locked and the wind wheel will come to rest. Loosely surrounding said collar 41 between shoulders 44 thereon is a band 45 having oppositely disposed trunnions 46 mounted in bearings in a loop 47 which forms part of a lever 48 pivoted at one extremity 49 within the tower T. The opposite end of said lever has an eye 50 from which a controlling cord 51 leads upward over a pulley 52 carried by the tower and thence downward as at 53 to a ring 54 in its lower end, the other stretch of said cord, 55, leading also downward throughout the length of the tower to a ring 56. Said rings are adapted to be independently engaged with pins 57 in a standard 58 disposed at a position near the ground and within reach of the operator. It is obvious that by disengaging the rings from the pins and drawing on the proper stretch of this rope, the operator may swing the lever 48 on its pivot 49 and cause the band 45 to move the collar 41 either up or down and therefore to rock the latches on their pivots 33 to either free the various sails and permit the wind wheel head to rotate or to latch the several booms against the uprights 31 and cause the wind wheel head to come to rest. The parts of this wind mill structure are of any desired sizes, shapes, proportions and materials; and changes in the details of construction may be made at will so long as the principle involved is retained.

What is claimed as new is:

1. In a wind mill, the combination with a horizontally rotating head comprising a framework, upright masts rising from said framework, booms movably mounted on said masts, sails carried by said masts and booms, and stops against which the booms strike when swung outward; of uprights rising from said framework, a catch pivoted across each upright and having a weight at one end and a beveled face and shoulder at the other adapted to engage the inner end of the boom, and mechanism for tripping all said catches at will.

2. In a wind mill, the combination with a horizontally rotating head comprising a framework including a ring, upright masts rising from said framework, booms movably mounted at their outer ends on said masts, sails carried by said booms, and stops on said ring against which the inner extremities of the booms strike when swung radially outward; of uprights rising from the hub of said framework and each having a nose, a catch pivoted across said upright and having a weight at one end and a beveled face and shoulder at the other adapted to coact with said nose to engage the inner end of the boom, and controlling mechanism for tripping said catches at will.

3. In a wind mill, the combination with a horizontally rotating head comprising a framework including a ring, upright masts rising from said framework, booms movably mounted at their outer ends on said masts, sails carried by said booms, and stops on said ring against which the inner extremities of the booms strike when swung radially outward; of uprights rising from the hub of said framework and each having a nose, a catch pivoted across said upright and having a weight at one end and a beveled face and shoulder at the other adapted to coact with said nose to engage the inner end of the boom, independent chains leading downward from the lighter ends of said catches, a vertically movable collar to which said chains are connected, a band swivelly engaging said collar and having opposite trunnions, a lever having a loop within which said trunnions are journaled, and means for swinging said lever from a position on the ground.

In testimony whereof I have hereunto set my hand in presence of two subscribing witnesses.

BENJAMIN F. SWIFT.

Witnesses:
ERNEST TANKSLEY,
NATHAN L. GILLIATT.

Copies of this patent may be obtained for five cents each, by addressing the "Commissioner of Patents, Washington, D. C."